United States Patent [19]
Ikeda

[11] Patent Number: 5,550,822
[45] Date of Patent: Aug. 27, 1996

[54] PRIVATE BRANCH EXCHANGE

[75] Inventor: Nobuhiro Ikeda, Kawasaki, Japan

[73] Assignee: Canon Kabushiki Kaisha, Tokyo, Japan

[21] Appl. No.: 355,809

[22] Filed: Dec. 14, 1994

Related U.S. Application Data

[63] Continuation of Ser. No. 54,316, Apr. 28, 1993, abandoned.

[30] Foreign Application Priority Data

Apr. 28, 1992 [JP] Japan .................................. 4-136345

[51] Int. Cl.⁶ .............................. H04J 3/02; H04Q 11/04
[52] U.S. Cl. ............................................................ 370/60.1
[58] Field of Search ................................. 370/60.1, 95.1, 370/60, 61, 85.7, 110.1, 79, 80; 379/93, 94, 219, 220, 225, 258

[56] References Cited

U.S. PATENT DOCUMENTS 5,014,266  5/1991  Bales et al. ............................ 370/60.1
5,051,992  9/1991  Taniguchi et al. .................... 370/110.1
5,157,660  10/1992 Kuwahara et al. ..................... 370/95.1

FOREIGN PATENT DOCUMENTS 4-16037  1/1992  Japan .

*Primary Examiner*—Wellington Chin
*Assistant Examiner*—Huy D. Vu
*Attorney, Agent, or Firm*—Morgan & Finnegan, L.L.P.

[57] ABSTRACT

A private branch exchange accommodates a line wire on a network side and a packet terminal and supports an ISDN packet switching service. A first call from the network side or terminal side is detected, and a B channel to perform packet switching for the first call is decided based upon the first call. A B channel assigned for a second call, which was placed prior to the first call, is specified when the first call is detected. This specified B channel is one that is being used in packet switching of the second call. In a case where the B channel that has been decided is different from the B channel that has been specified, negotiation is performed with the network or terminal and the specified B channel is ultimately decided to be the channel that will be used in packet switching for the second call.

19 Claims, 17 Drawing Sheets

CHANNEL STATUS TABLE

|    | MULTIPLEXING | ASSIGNMENT STATUS |
|----|--------------|-------------------|
| B1 | POSSIBLE     | ASSIGNED          |
| B2 | POSSIBLE     | NO                |

SET-UP MESSAGE FORMAT

FIG. 13

|  | B₁ | B₂ | B₁ | B₂ | B₁ | B₂ |
|---|---|---|---|---|---|---|
|  | 0 | 0 | 0 | 1 | 1 | 0 |
| B_T = B₁ | B₁ || B₂ || B₁ ||
| B_T = B₂ | B₂ || B₂ || B₁ ||

0 : NOT ASSIGNED
1 : ASSIGNED

PRIVATE BRANCH EXCHANGE

This is a continuation of application Ser. No. 08/054,316, filed on Apr. 28, 1993 now abandoned.

BACKGROUND OF THE INVENTION

This invention relates to a private branch exchange that supports a packet exchange service of an ISDN (integrated services digital network).

A line switching service and a packet switching service have been proposed as data communication exchange services in a public network. A DDX-C (line switching service) is available as one of the line switching services, and a DDX-P (a packet switching service of a first kind), a DDX-TP (a packet switching service of a second kind) and an INS-P (information network system-P) (ISDN packet switching service) are available as packet switching services. A packet switching service has the following features in comparison with a line switching service:

(1) Terminals having different speeds can communicate with each other. Since the network has a store-and-forward switching function, data communication can be performed even when terminals have different communication speeds.

(2) Terminals having different procedures can communicate with each other. By virtue of the fact that the network makes a conversion among communication procedures, even terminals having different procedures can communicate with each other.

(3) Multiplexed communication of packets is possible. By changing addressee information, it is possible for a plurality of parties to communicate with one another using a single physical line.

(4) Alternative routes can be selected. A route within a network can be selected by the addressee information even if a trunk circuit or the like fails during communication.

(5) Users can be billed for the amount of information used. In other words, users are billed in accordance with information quantity (packet data).

Owing to the features mentioned above, packet switching services are being utilized, regardless of whether terminals employ different speeds and procedures, in conversational-type data communication such as communication between personal computers, various reservation systems, etc. Further, with the aforesaid INS-P, a packet switching service in available not only in a B channel, which is an information channel, but also in a D channel, which is a signal channel. The usefulness of this system is being advocated strongly.

For these reasons, users of packet switching systems have been increasing year by year not only in industry but in general.

In a case where a packet switching service is utilized by employing an ISDN basic access interface (of two B and D channels), it is possible to utilize both the line switching and packet switching services within a single interface (two B channels+one D channel) by entering into an agreement.

However, even with an agreement that allows use of both the line switching and packet switching services within a single interface, either one service is allowed by the agreement of line switching and packet switching services for both channels. Specifically, in a case where the B1 channel and the B2 channel of the interface are both utilized in the packet switching service, the line switching service will no longer be utilizable. This means that important voice communication or data communication cannot be utilized in the prior art.

SUMMARY OF THE INVENTION

An object of the present invention is to provide a private branch exchange capable of being utilized in important voice communication or data communication, etc., in which an idle channel for a line switching service can always be acquired irrespective of the status of utilization of a packet switching service.

According to the present invention, the foregoing object is attained by providing a private branch exchange, which accommodates a main wire on a network side and a packet terminal, for supporting a packet switching service, comprising: detecting means for detecting origination of a first call from the network side or terminal side; deciding means for deciding, based upon the first call, a channel to perform packet switching for the first call; means for specifying a channel assigned for a second call, which was placed prior to the first call, when the first call is detected, said specified channel having been used in packet switching of the second call; and negotiation means, in a case where the channel that has been decided by said deciding means is different from the channel that has been specified by said specifying means, for negotiating with the network or terminal and ultimately deciding that the channel specified by said specifying means will be the channel used in packet switching for the second call.

In accordance with the private branch exchange exchanged constructed as set forth above, the specified B channel within the central office interface is used exclusively for the packet switching service by utilizing a packet multiplexing function as much as possible. As a result, it is possible for a remaining channel to be acquired in an idle state at all times for the line switching service. This makes it possible to realize effective use of a variety of services such as important voice communication or data communication.

Another object of the invention is to provide a private branch exchange in which designation of a channel used in packet switching in multiplexed fashion is allowed from an extension terminal.

A further object of the invention is to provide a private branch exchange in which designation of a B channel used in packet switching in multiplexed fashion is allowed from the network side.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 13 is a diagram showing results of a channel change in the second embodiment;

DESCRIPTION OF THE PREFERRED EMBODIMENTS

Four preferred embodiments of the present invention will now be described with reference to the accompanying drawings.

First Embodiment

Figure 1:
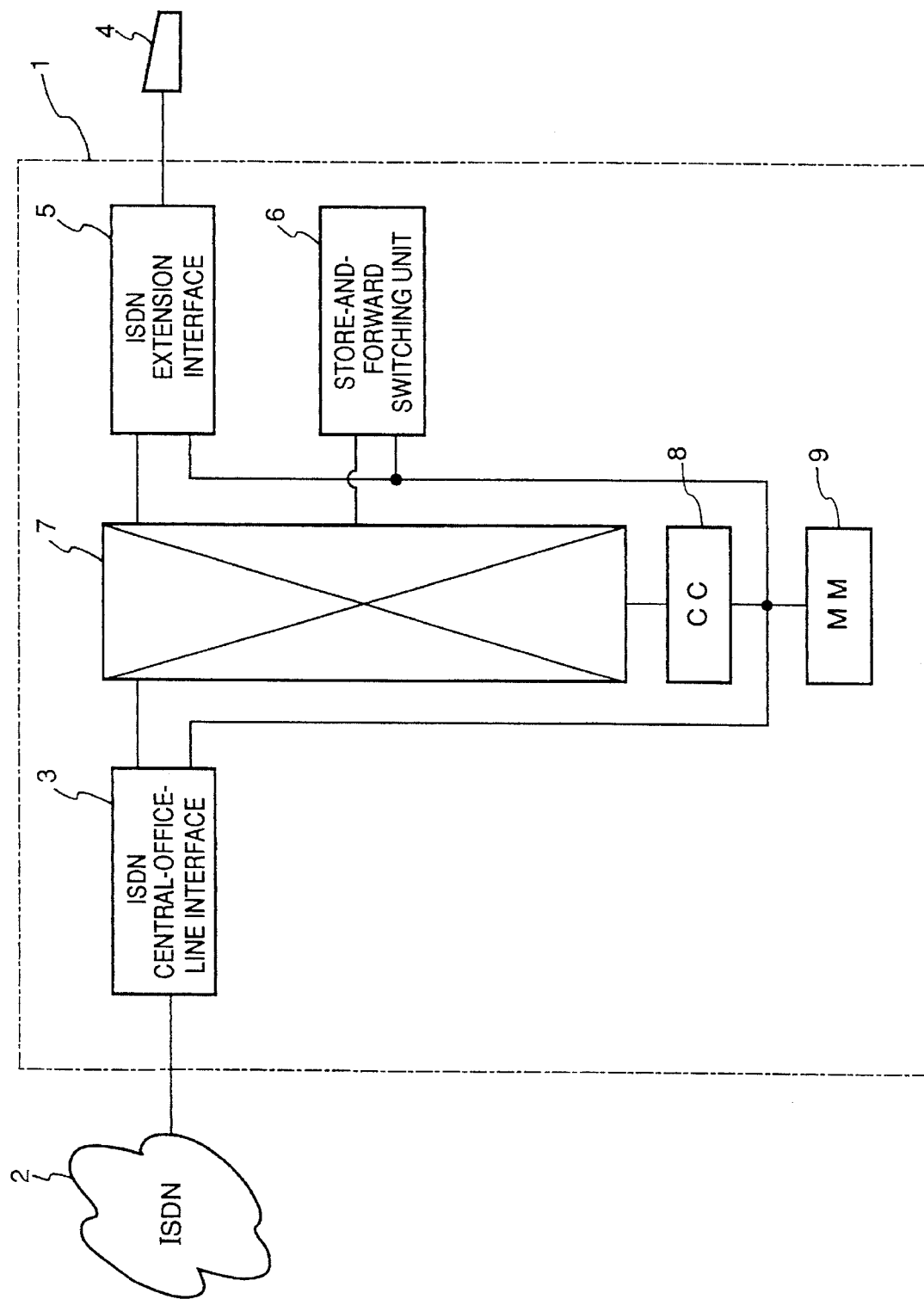
FIG. 1 is a block diagram illustrating a private branch exchange system according to a first embodiment of the present invention.

FIG. 1 is a block diagram illustrating a private branch exchange system according to a first embodiment of the present invention.

As shown in FIG. 1, a private branch exchange 1 includes an ISDN main-wire (central office line) interface 3 that accommodates an ISDN 2, an ISDN interface 5 that accommodates an ISDN packet mode terminal 4, a store-and-forward switching unit 6 for store-and-forward switching of packet data, a channel switch 7 for channel switching, a communication controller (CC) 8 for supervising overall control of the exchange 1, and memory (MM) 9 for storing a control program and various data.

Figure 2:
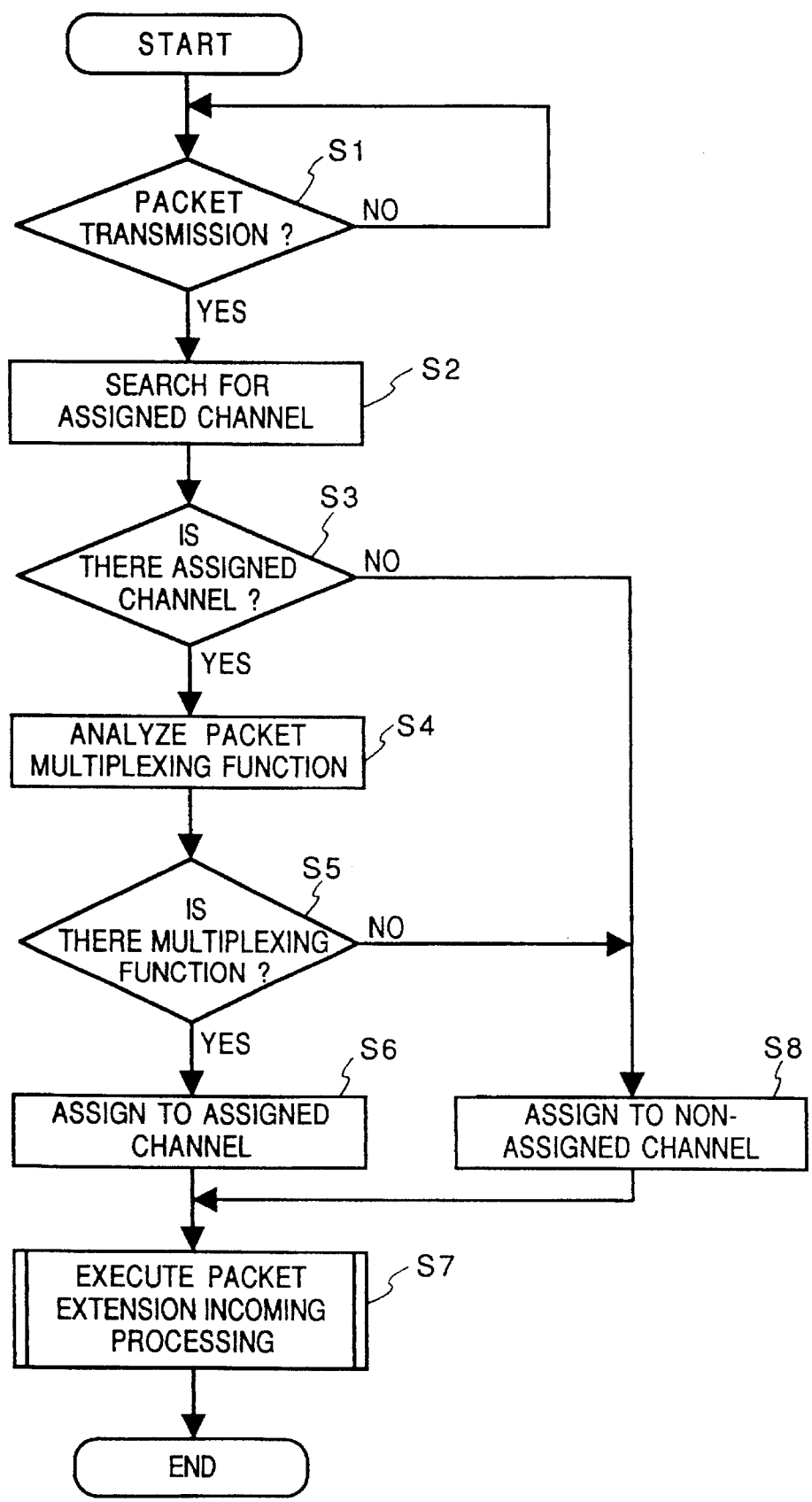
FIG. 2 is a flowchart illustrating a control operation according to the first embodiment.
Figure 3:
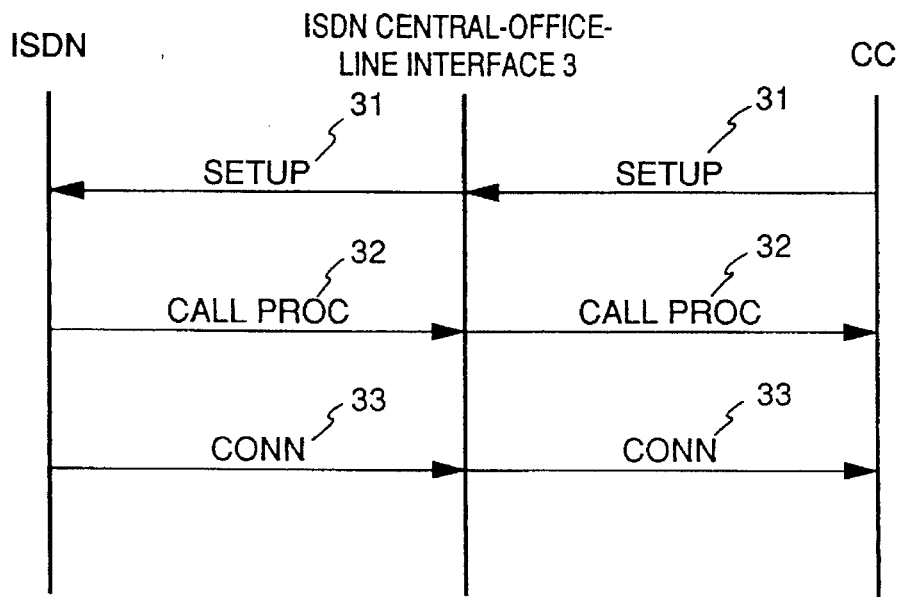
FIG. 3 is an explanatory view showing a communication sequence according to the first embodiment.
Figure 4:
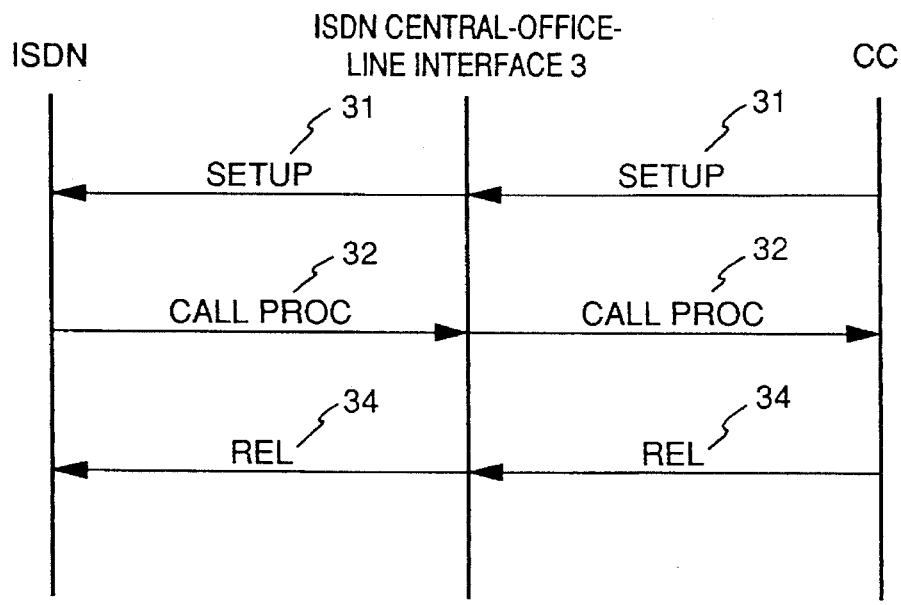
FIG. 4 is an explanatory view showing a communication sequence according to the first embodiment.

FIG. 2 is a flowchart for describing the control operation of the first embodiment. FIGS. 3 and 4 are explanatory views illustrating the sequence of communication between the ISDN 2 and the exchange 1. FIG. 3 illustrates the transmission/reception of messages at the time that channel negotiation is established, and FIG. 4 illustrates the transmission/reception of messages when channel negotiation is not established.

The characterizing features of the first embodiment are as follows:

(1) In a case where a new call is placed during the time that a B channel is being used in packet switching owing to an earlier call, mediation takes place in such a manner that packet switching for the new call is performed in the B channel in which the packet switching for the earlier call is currently being carried out. In other words, the packet switching operation for the earlier call and the packet switching operation for the later call are performed in multiplexed fashion over the same B channel.

The multiplexing always assures an idle channel. When a new call is generated, line switching can be carried out using the idle B channel by virtue of multiplexing.

(2) More specifically, if the aforementioned new call is issued from a terminal, the exchange 1 searches for the B channel already being used in order to process the earlier call and proposes the in-use channel to the terminal. Thus, in a case where a channel being used for the earlier call is B1, the channel B1 will be used for packet switching of a new call. This assures that the channel B2 is always idle and not occupied by packet switching.

(3) The exchange negotiates with the network 2 with regard to whether this B channel is suitable or not. If the result of negotiation is that the B channel assigned by the exchange 1 has been accepted on the side of the network 2, then the packet switching operation for the earlier call and the packet switching operation for the new call are performed in multiplexed fashion over the this channel B. On the other hand, if the negotiation ends in failure, then a release message is of course sent from the exchange 1 to the network 2.

Figures 5, 6:
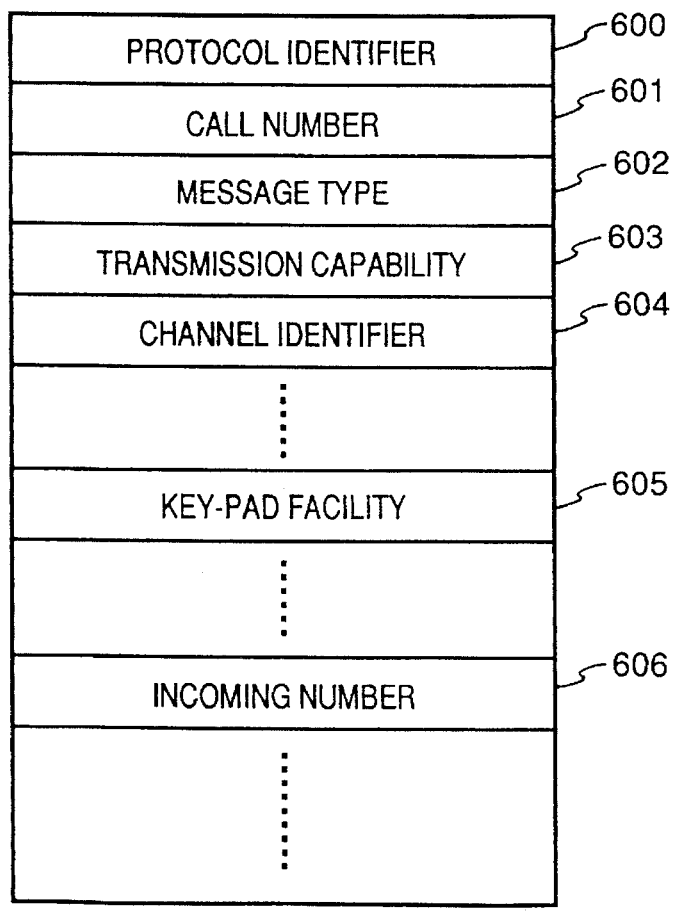
FIG. 5 is a diagram showing the constitution of a channel status table used in various embodiments of the invention.
FIG. 6 is a diagram showing the constitution of a call-setting message used in various embodiments of the invention.

FIG. 5 illustrates a channel status table for storing the status of each of B1 and B2 channels. This table is stored in the memory 9. A "multiplexing" field stores data indicating whether the particular channel has been assigned in such a manner that packet data is capable of being processed in accordance with a time-division multiplexing technique. This "multiplexing" field is set in advance by contract. Once the data within this "multiplexing" field has been established, it can be changed only if the contract is changed. An "assignment" field stores data indicating whether the particular channel is being used or not.

The operation of the first embodiment will be described based upon the control procedure of FIG. 2 illustrated in the form of a flowchart.

At step S1 in FIG. 2, the ISDN extension interface 5 waits for a call-setting message (SETUP) to be sent from the ISDN packet terminal 4. When the ISDN extension interface 5 detects this call-setting message (SETUP), the interface 5 sends this call-setting message to the communication controller 8. In response, the communication controller 8 searches (step S2) for the B channel, which has already been assigned to the packet switching service, among the B channels of the central-office-line interface 3 for which the packet switching service has been contracted. In other words, the communication controller 8 searches the "idle" field in the table of FIG. 5 to retrieve a channel marked "assigned". In the example of FIG. 5, channel B1 has been assigned and channel B2 has not been assigned. The B channels are investigated at step S3 to determine whether they include an assigned channel. The program proceeds to step S4 if an assigned channel is found and to step S8 if an assigned channel is not found.

First, a case will be described in which it is assumed that none of the B channels have been assigned. In such case, the program proceeds from step S3 to step S8, at which the number of a non-assigned B channel that has been found is set in channel-in-use information within the call-setting message (SETUP) after it has been verified that there is an agreement according to which the non-assigned channel utilizes a packet switching service.

FIG. 6 illustrates the format of the call-setting message. The assignment of the number of the B channel at step S8 is performed by writing the non-assigned B channel number in a "channel identifier" field 604 within the message. In the example of FIG. 5, the channel B2 is assigned to a call from the ISDN terminal 4. Packet central office line transmission processing is executed at step S7.

The operation involved in packet central office line transmission processing at step S7 will be described with reference to FIGS. 3 and 4.

First, the communication controller 8 transmits the call-setting message SETUP to the ISDN central-office-line interface 3 (this operation is indicated by SETUP 31 in FIG. 3). The message SETUP is set so as to indicate that the B channel not assigned will be assigned henceforth. The ISDN central-office-line interface 3 transmits this call-setting message (SETUP 31) to the ISDN 2.

The ISDN 2, which has received the call-setting message 31 from the exchange 1, analyzes the channel-in-use information (a channel identifier 604 in FIG. 6) within the call-setting message 31. If the ISDN 2 determines that this B channel is utilizable (i.e., that an agreement has been concluded), then the ISDN 2 sets the identifier of this B channel designated by the exchange 1 in a call-setting reception message (CALL PROC 32 in FIGS. 3 and 4) and then transmits this message to the ISDN central-office-line interface 3. Upon receiving the message CALL PROC, the ISDN central-office-line interface 3 transmits the call-setting reception message CALL PROC to the communication controller 8.

On the basis of the call-setting reception message CALL PROC from the network 2, the communication controller 8 waits for reception of an answer message (CONN 33 in FIG. 3), which is sent from the ISDN 2, upon verifying that the B channel designated by the exchange 1 has been accepted by the ISDN 2. The network 2 eventually transmits the answer message (CONN 33) to the ISDN central-office-line interface 3. When this answer message (CONN 33) is received from the network 2, the ISDN central-office-line interface 3 transmits this message to the communication controller 8. The foregoing is packet central-office-line transmission processing (step S7) in a case where channel negotiation with the network 2 is established.

A case in which the ISDN 2 judges that the B channel assigned by the exchange 1 is incapable of being used (e.g., a case in which an agreement has not been concluded) will now be described with reference to FIG. 4. By way of example, it will be assumed that the channel B2 which the exchange 1 has designated by the SETUP message is not covered by an agreement the subject of which is packet switching. In such case, the ISDN 2 judges that the channel B2 designated based upon the channel-in-use information within the aforementioned call-setting message (SETUP 31) is incapable of being used, sets information to the effect that the channel used by the exchange 1 is to be changed to a B channel (channel B1, for example) usable on the side of the ISDN 2 in the call-setting reception message (CALL PROC 32 in FIG. 4) and transmits this message to the ISDN central-office-line interface 3. The ISDN central-office-line interface 3, which has received this message, transmits the message to the communication controller 8.

There are instances in which the exchange cannot accept the channel-change request from the network 2. If the request for changing the B channel from the ISDN 2 is capable of being accepted, the communication controller 8 waits for reception of the answer message (CONN 33) from the ISDN 2 (FIG. 3). If the ISDN 2 has already received the message SETUP, it will transmit the answer message (CONN 33 in FIG. 3) to the ISDN central-office-line interface 3. When the ISDN central-office-line interface 3 receives the answer message CONN from the network 2, it sends this answer message to the communication controller 8. This concludes the control procedure by the B channel designated by the network 2.

A case in which the request for changing the B channel from the ISDN 2 is not capable of being accepted will be described with reference to FIG. 4. Such rejection by the terminal is necessary in a case there will be no idle channel if the network designated channel is used. Accordingly, in a case where the channel (e.g., B1) designated for change by the network 2 is not to be used, the communication controller 8 sets information indicating the reason in a release message (REL 34 in FIG. 4) and transmits this release message to the ISDN central-office-line interface 3 in order to start disconnection processing. The ISDN central-office-line interface 3 transmits this release message to the ISDN 2. Consequently, a single idle channel is always assured by the embodiment. The idle channel will be used for line switching and data communication in emergency case.

The foregoing is a control procedure of assigning to a non-assigned channel in a case where a call has been placed from a terminal and all B channels are non-assigned. The packet central-office-line transmission processing of step S7 is the same also in the description regarding a case in which all B channels are not non-assigned.

Next, a case will be described in which, when a call has been placed from the terminal 4, it is ascertained which B channel (B1, B2 or both) of two B channels is in use (assigned) for packet switching.

In a case such as this, whether packet multiplexing is possible with regard to one B channel ascertained to be in use (assigned) is analyzed at step S4. In the example of FIG. 5, it has been established beforehand that the channels B1, B2 both are capable of being multiplexed. Only the channel capable of being multiplexed is selected at step S5, and it is arranged at step S6 so that the selected channel B is used for the purpose of packet switching of the current call. In other words, in a case where one B channel is in use in packet switching of an earlier call, it is attempted to multiplex the packet of the current call on this B channel that is in use. At step S6 in FIG. 2, the number of the channel thus selected is stored in the "channel identifier" field in the call-setting message SETUP (31 in FIG. 3) of FIG. 6, and the message 31 is transmitted to the ISDN central-office-line interface 3. The interface 3 transmits this call-setting message to the ISDN 2. The exchange 1 then executes the packet central-office-line transmission processing at step S7. This processing has already been described.

Effects of First Embodiment

The private branch exchange according to the first embodiment described above, will use a channel which is being used for packet switching of an earlier call for packet switching of the next call, whereby the B channel undergoes packet switching multiplexing. By virtue of this packet switching multiplexing, a single idle B channel is always assured, and it will be used for line switching and data communication in emergency case.

Figure 22:
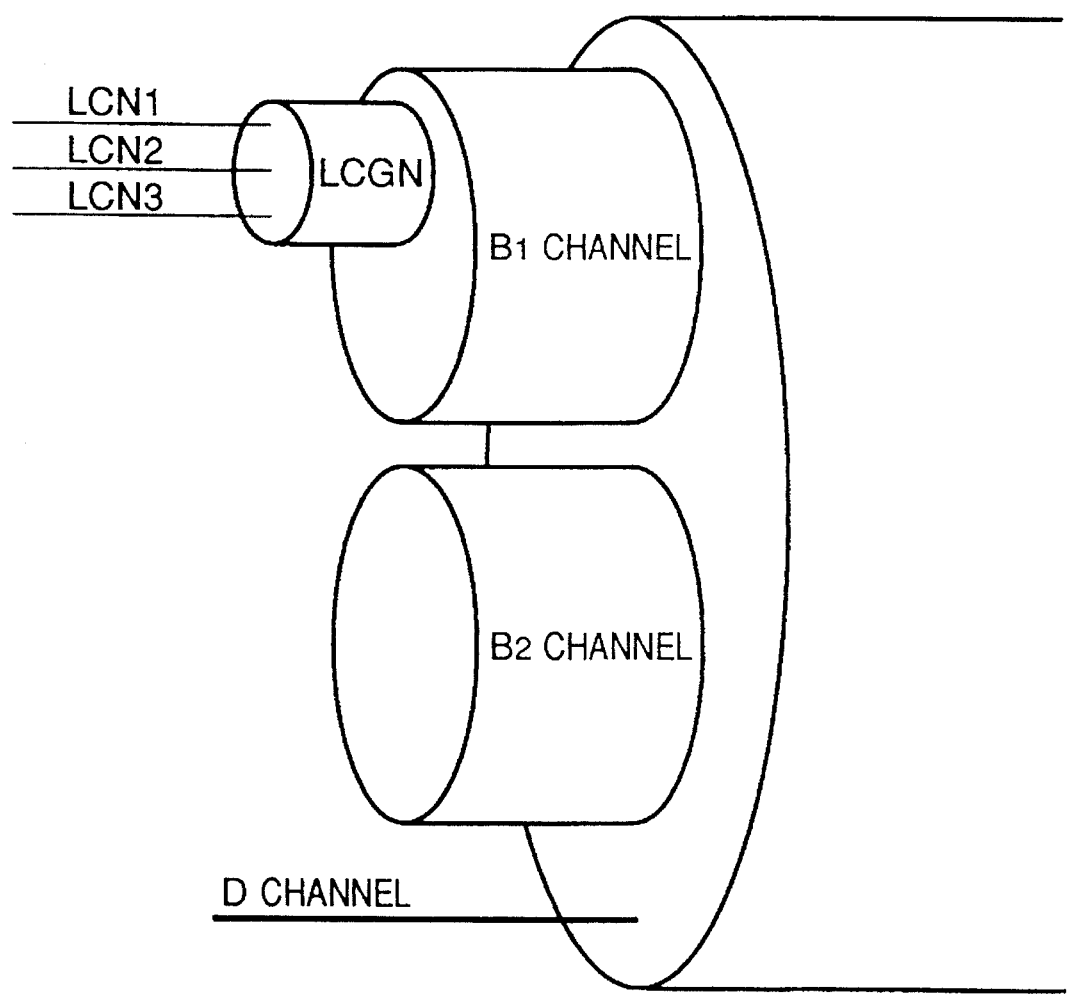
FIG. 22 is a diagram showing the usage of a B channel in the embodiments.

FIG. 22 illustrates the usage of B channels according to the embodiments. In a case where the agreement is for "arbitrary class" and "normal connection", a single B channel accomodates sixteen logical channel groups each of which accomodates 248 logical channels. In one B channel, there can be 16×248 packet multiprocessing operations.

Modification of First Embodiment

In the first embodiment (FIG. 1) set forth above, the description deals solely with an ISDN packet terminal. However, it is not always necessary for the extension of the exchange to be an ISDN packet terminal. The present invention can be realized in a similar manner also through a transmitting operation performed by an ordinary packet terminal.

Figure 7:
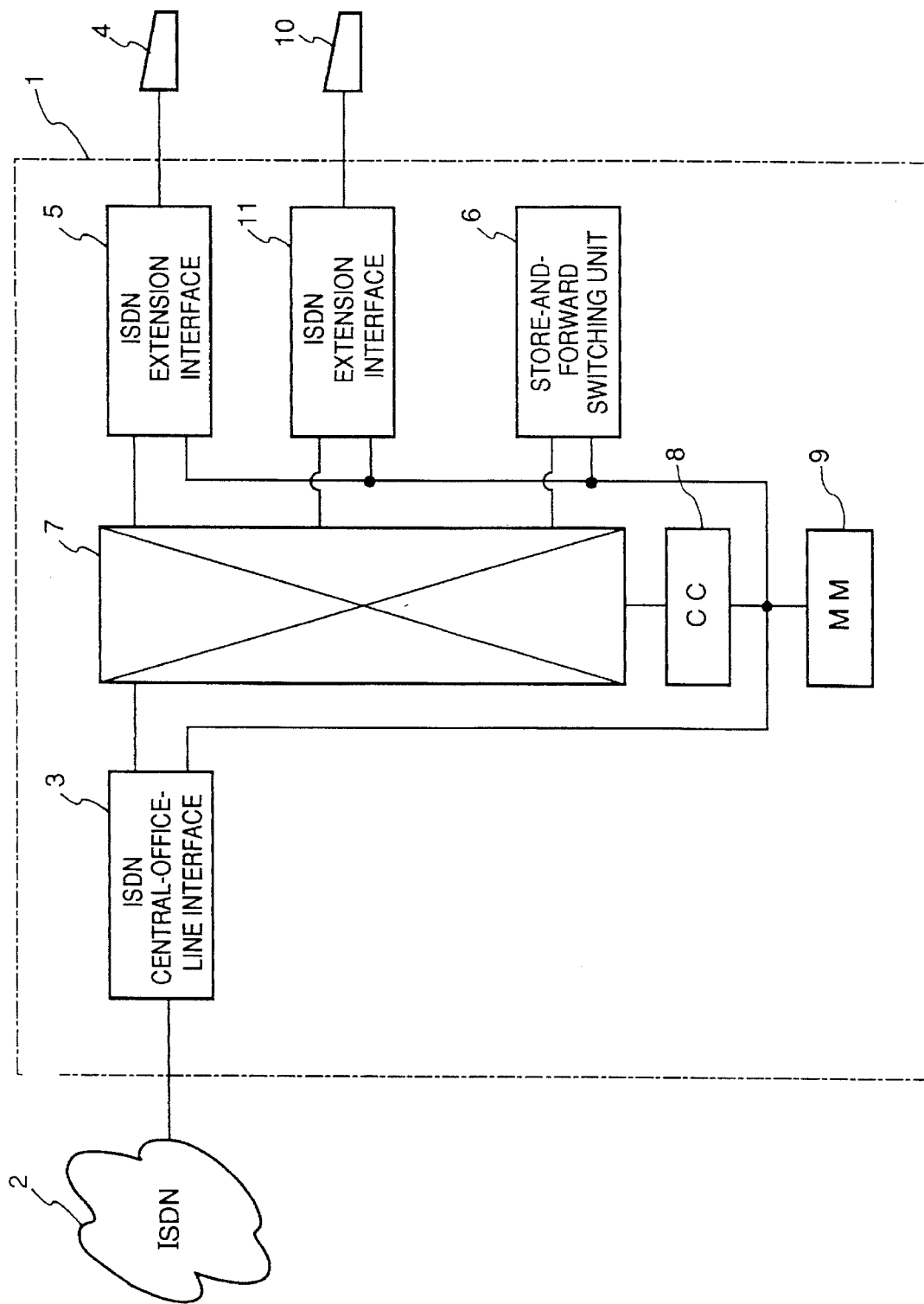
FIG. 7 is a block diagram illustrating a private branch exchange system according to a modification of the first embodiment.

FIG. 7 is a block diagram illustrating the configuration of a private branch exchange system in a modification of the first embodiment. In the system of the second embodiment, an extension interface 11 accommodating a packet terminal 10 is provided in addition to the components of the first embodiment.

Second Embodiment

Figure 8:
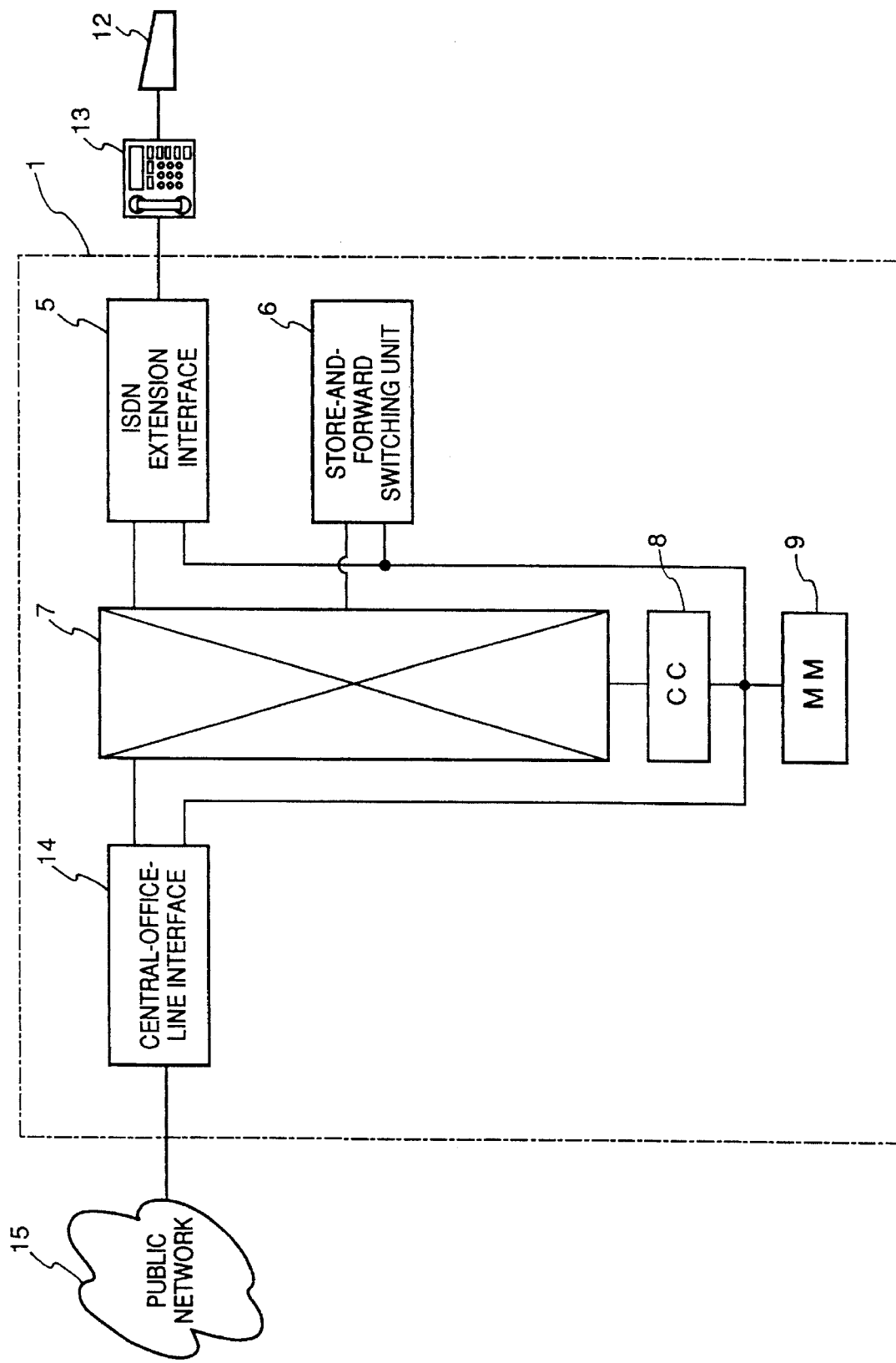
FIG. 8 is a block diagram illustrating a private branch exchange system according to a second embodiment of the present invention.

FIG. 8 is a block diagram illustrating the configuration of a private branch exchange system in a second embodiment of the present invention.

In the system configuration of the second embodiment, an ISDN telephone terminal 13 is connected to the ISDN extension interface 5, and an ordinary packet terminal 12 is connected to the ISDN telephone terminal 13. The system has an ordinary central-office-line interface 14 instead of the ISDN central-office-line interface 3 of the first embodiment (FIG. 1), and the central-office-line interface 14 accommodates a public network 15. Other components are similar to those of the first embodiment (FIG. 1).

In the first embodiment, a B channel already assigned is selected from the B channels of the interface with the network capable of being used by the exchange 1, and a channel to be used for packet switching of a new call from an extension terminal is allocated preferentially to the B channel selected.

In the second embodiment, however, it is possible for a B channel (number $B_T$) being considered on the user side to be designated tentatively on the side of the originating terminal when it is desired to use this originating terminal in packet switching. In other words, if there is a B channel (number $B_P$) already assigned among the other B channels allocated to the extension interface to which this terminal is connected, and if this channel $B_P$ is capable of packet multiplexing, then preference is given to use of the channel $B_P$ for packet switching, rather than to the channel $B_T$ designated by the terminal.

Figure 11:
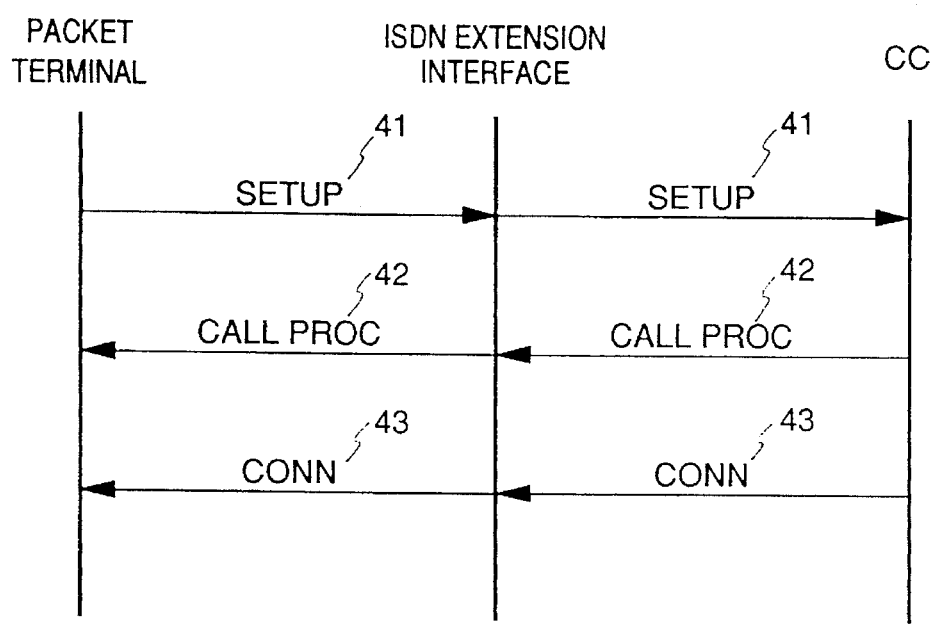
FIG. 11 is an explanatory view showing a communication sequence according to the second embodiment.
Figure 12:
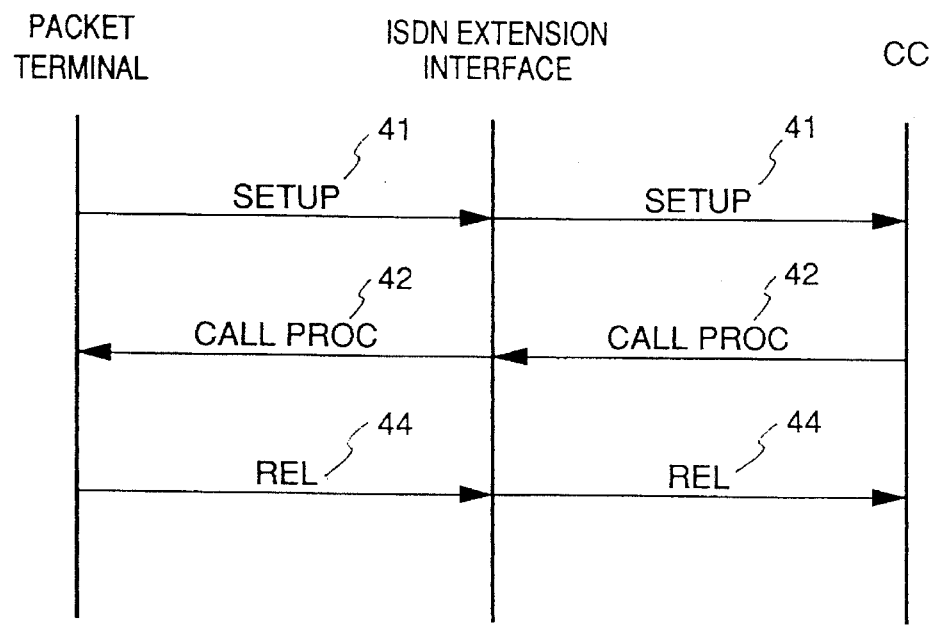
FIG. 12 is an explanatory view showing a communication sequence according to the second embodiment.

More specifically, the first and second embodiments are similar in that a channel already being used in packet switching is employed in multiplexed fashion in packet switching for a new call. In the first embodiment, however, the multiplexed channel is decided not by the user but on the side of the exchange 1. Therefore, the negotiation (FIGS. 3 and 4) for the final decision regarding the used channel is performed between the exchange 1 and the network 2. In the second embodiment, a tentative designation of the used channel initially is performed on the terminal side (i.e., on the user side), and therefore the negotiation for the final decision of the used channel is performed between the exchange 1 and the user side (FIGS. 11 and 12).

Figure 9:
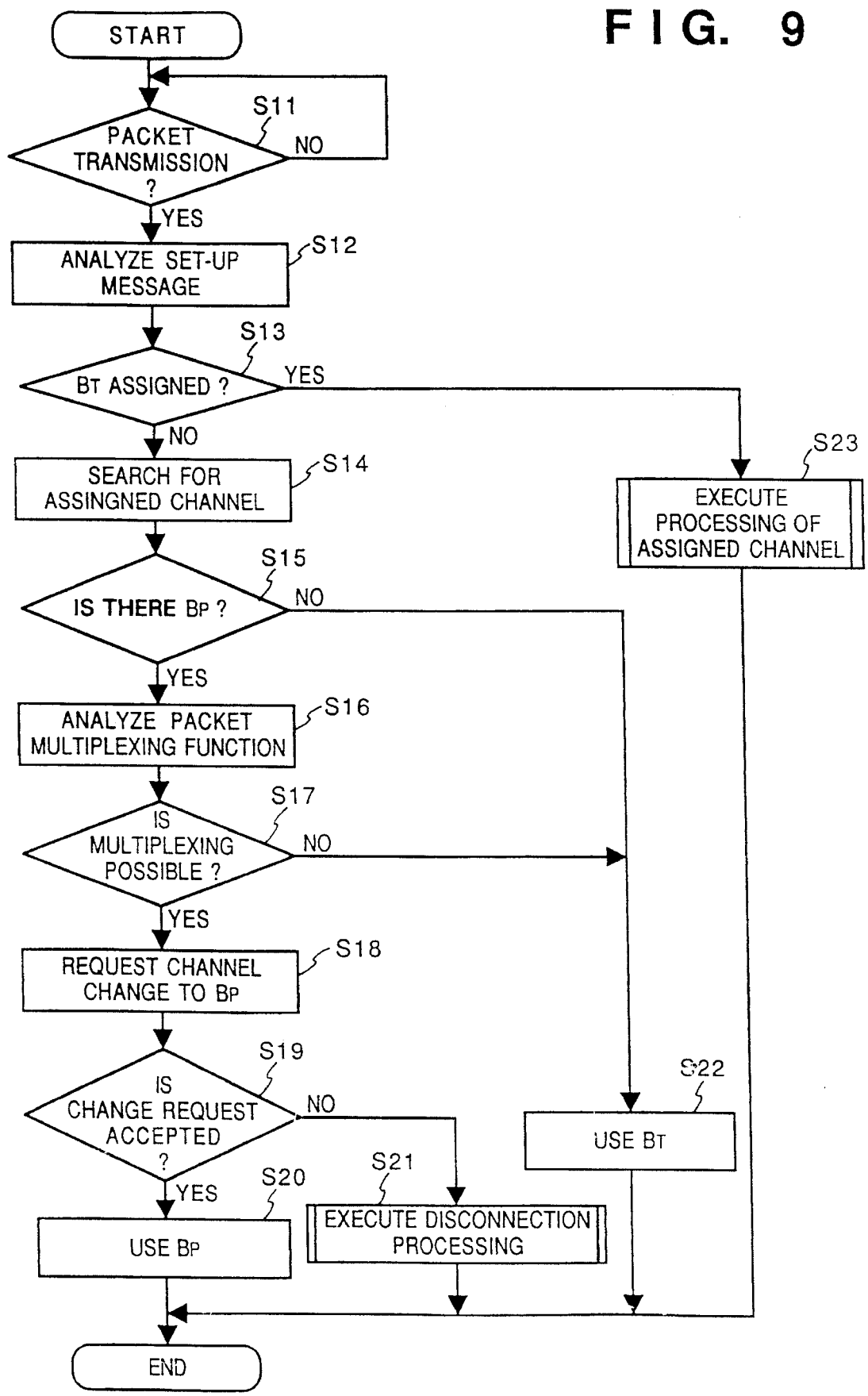
FIG. 9 is a flowchart illustrating a control operation according to the second embodiment.
Figure 10:
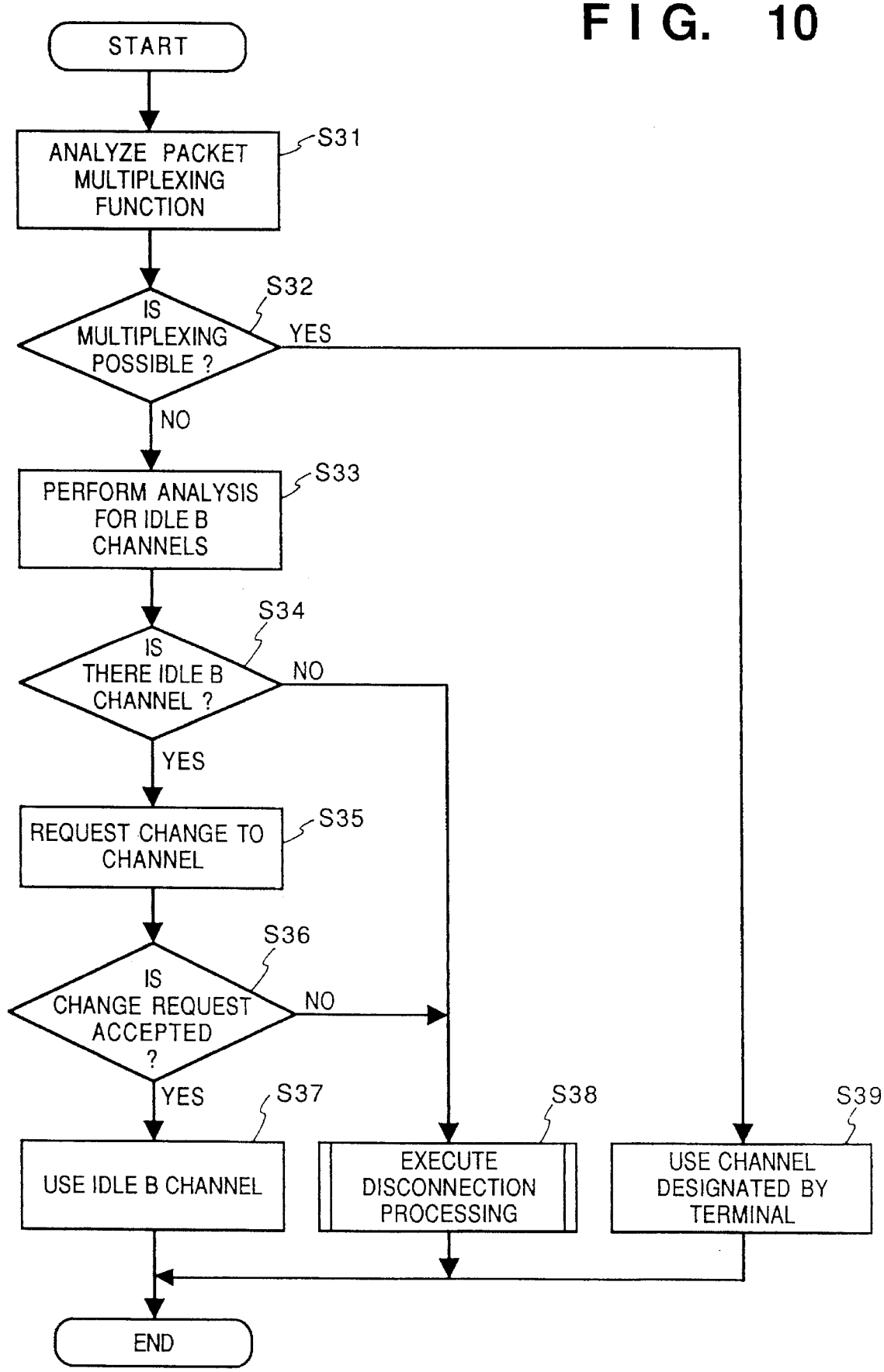
FIG. 10 is a flowchart illustrating a control operation according to the second embodiment.

FIGS. 9 and 10 are flowcharts for describing the control operation of the second embodiment. FIG. 9 illustrates the overall control procedure at the time of packet transmission and FIG. 10 illustrates the details of the processing operation at step S23 of FIG. 9. Further, FIGS. 11 and 12 are explanatory views illustrating the sequence of communication between the packet terminal 12 and the exchange 1. FIG. 11 illustrates the transmission/reception of messages at the time that channel negotiation is established, and FIG. 12 illustrates the transmission/reception of messages when channel negotiation is not established.

At step S11 in FIG. 9, the ISDN extension interface 5 waits for a call-setting message (SETUP 41 in the example of FIG. 11) from the packet terminal 12. When the ISDN extension interface 5 detects this message, the interface 5 sends this call-setting message to the communication controller 8. Since the format of the call-setting message from the packet terminal 12 is the same as that of the call-setting message sent to the ISDN 2 from the exchange 1 shown in FIG. 6, this figure will be referred to here. In other words, the call-setting message includes an identifier that specifies the B channel designated by the originating terminal.

The communication controller 8 analyzes the channel identifier contained in the call-setting message. To simplify the description, $B_T$ will represent the channel designated by the terminal 12. At step S13, the communication controller 8 determines whether the analyzed channel $B_T$ is already being used by a packet switching service owing to another call. It should be noted that since the second embodiment also has the channel status table of FIG. 5 within the memory 9, the communication controller 8 is capable of judging whether a channel is being used in a packet switching service.

In Case Where Channel $B_T$ Is Not Assigned (NO at Step S13)

If it is judged at step S13 that channel $B_T$ designated by the extension interface 5 has not yet been assigned to a packet switching service, then the program proceeds to step S14. Here a search is performed to find a B channel within an interface (extension interface 5 in the example of FIG. 18) identical with the interface connected to the terminal at which a call originated, this channel being one already assigned to a packet switching service. If B1 is busy and B2 is not in use, the channel found at step S14 is B1 when $B_T$=B2 holds.

Next, if it is judged at step S15 that a B channel already being used by a packet switching service (to simplify the explanation, $B_P$ will represent a channel already being used by a packet switching service) does not exist, then the program proceeds to step S21, at which the B channel BT designated by the terminal 12 is used for the purpose of packet switching.

On the other hand, if a YES answer is obtained at step S15, i.e., if the channel $B_P$ already assigned to a packet switching service exists, then an analysis is performed at step S16 to determine whether the B channel $B_P$ is capable of packet multiplexing. This analysis is carried out based upon the table of FIG. 5.

If a B channel capable of multiplexing does not exist, then it is decided that packet switching for the current call will employ channel $B_T$ designated by the terminal 12.

A case will now be described in which the already assigned channel $B_P$ is judged to be capable of packet multiplexing at step S17. In this case, it is necessary for the exchange 1 to notify the terminal 12 of the fact that the channel used will be changed. Accordingly, the communication controller 8 sets a request in the call-setting reception message (CALL PROC 42 in FIG. 11) and sends this message to the ISDN extension interface 5. The request is for making a change to the channel $B_P$, found at step S14, to use this channel instead of the channel $B_T$ designated by the terminal 12. It should be noted that the field of this request bit is set aside beforehand at a prescribed position of the call-setting reception message. Upon receiving the message 42, the ISDN extension interface 5 transmits the message 42 to the packet terminal 12 via the ISDN telephone network 13.

Upon receiving the call-setting reception message CALL PROC, the packet terminal 12 is required to reply as to whether the change request is acceptable or not. If the change request is not acceptable, the packet terminal 12 sends a release message (a REL message 44 in FIG. 12) to indicate this fact. If the change request is acceptable, then the packet terminal 12 waits for a CONN message, which will eventually be sent from the interface 5. The CONN message means that the establishment of a call between the network and the exchange 1 has ended.

Upon receiving the CONN message from the network 2 at step S19, the communication controller 8 sends this message to the interface 5. The latter sends the answer message 43 to the packet terminal 12 via the ISDN telephone terminal 13. As a result, at step S20 the ISDN interface 5 employs the channel $B_P$, which has already been assigned for packet switching, in cooperation with the packet terminal 12, and performs communication for packet switching of the current call.

A case in which the packet terminal 12 is incapable of accepting the request for change of the B channel from the communication controller 8 will now be described. In such case, the packet terminal 12 sends the release message (REL) 44 and therefore the ISDN interface 53 sends the received release message 44 to the communication controller 8 so that processing to cut off communication is executed at step S21.

In Case Where Channel $B_P$ Is Assigned (YES at Step S13)

If it is judged at step S13 that the B channel analyzed at step S12 has already been assigned to a packet switching service, then the program proceeds to step S23, where use is made of the B channel $B_P$ already assigned.

The details of step S23 will be described in detail with reference to the flowchart of FIG. 10.

The communication controller 8 performs analysis at step S31 in FIG. 10 to determine whether the B channel $B_P$ is capable of packet multiplexing. In a case where the channel $B_P$ is capable of packet multiplexing (YES at step S32), the communication controller 8 sets the B channel $B_T$, which has been designated by the terminal 12, in the call-setting reception message (CALL PROC 42) at step S39 and sends this message to the ISDN extension interface 5. Upon receiving the message 42, the ISDN interface 5 sends the call-setting reception message 42 to the packet terminal 12 via the ISDN telephone terminal 13.

Thus, if the channel $B_T$ designated by the terminal has already been assigned in a case where a new call has been issued from the terminal, the channel $B_T$ already assigned is used for the purpose of packet switching of the current call as long as the channel $B_T$ is capable of being multiplexed.

FIG. 13 is a diagram showing results of a channel change in the second embodiment. If channels B1, B2 are both capable of multiplexed packet communication and both have been assigned (=1) or both have not been assigned (=0), the exchange 1 in the second embodiment selects B1 as $B_P$ in a case where the channel $B_T$ designated on the terminal side is B1 and selects B2 as $B_P$ in a case where the channel $B_T$ designated on the terminal side is B2.

A case in which packet multiplexing is found not to be possible at step S32 will now be described. In this case, the channel $B_T$ designated by the terminal is already assigned to packet switching. Therefore, though the channel $B_T$ originally is desired to be used in line switching, another idle B channel is employed out of necessity since the channel $B_T$ is incapable of being multiplexed. For example, if B1 is incapable of multiplexed communication although $B_T$=B1 holds, the idle channel becomes B2 (this channel will be represented by $B_E$ for the sake of the description).

In such case, the communication controller 8 searches for an idle B channel within the same interface at step S33. If an idle B channel exists (YES at step S34), then it is necessary for the communication controller 8 to notify the terminal 12 of the fact that a change will be made to the idle B channel $B_E$ to use this instead of the B channel designated by the terminal 12. Accordingly, the communication controller 8 sets a change request bit in the call-setting reception message (CAL PROC 42) and sends this message to the ISDN line interface 5 (step S35). Upon receiving the message 24, the ISDN extension interface 5 transmits the message 42 to the packet terminal 12 via the ISDN telephone terminal 13.

Upon receiving this call-setting reception message, the packet terminal 12 waits for reception of the answer message (CONN) 43 from the communication controller 8 in a case where the B-channel change request is found to be acceptable (YES at step S36). The communication controller 8 sends the answer message 43 to the ISDN extension interface 5, which then sends the answer message 43 to the packet terminal 12 via the ISDN telephone terminal 13. As a result, the packet terminal 12 performs communication using the idle B channel (step S37). On the other hand, if the packet terminal 12 is found to be incapable of accepting the B-channel change request from the communication controller 8 at step S36, information indicating the reason is set in the release message (REL) 44 and this message is sent to the ISDN extension interface 5, whence the message 44 is transmitted to the communication controller 8 (step S38). The communication controller 8 executes disconnection processing upon receiving this message. If an idle B channel is found not to exist at step S34, disconnection processing (step S38) is executed in similar fashion.

Modification of Second Embodiment

Figure 14:
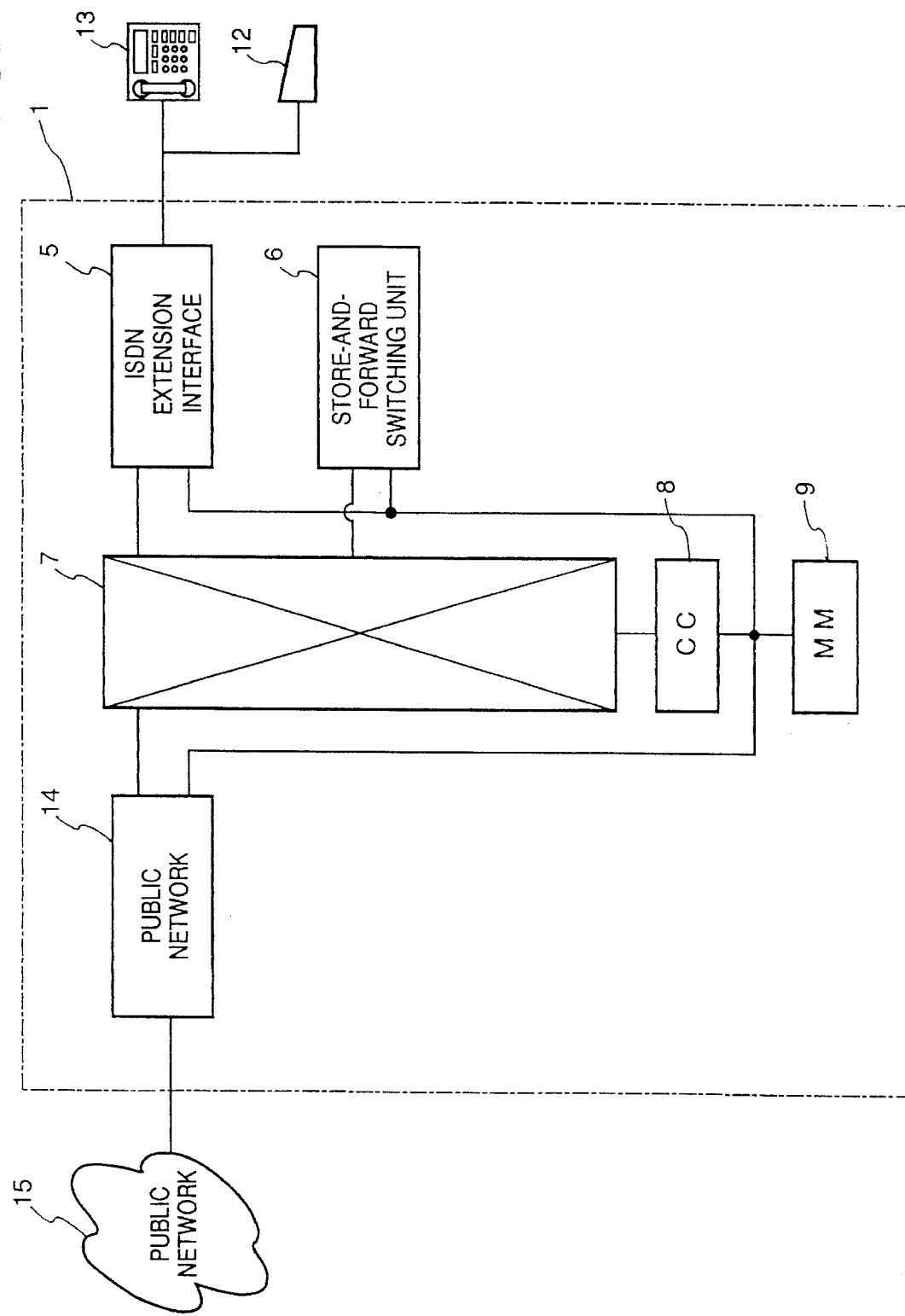
FIG. 14 is a block diagram illustrating a private branch exchange system according to a modification of the second embodiment.

In the second embodiment described above, the packet terminal 12 is connected to the ISDN telephone terminal 13. However, the invention is not limited to such an arrangement. FIG. 14 is a block diagram showing the system configuration of a private branch exchange exemplifying a modification of the second embodiment.

In this modification, the packet terminal 12 is connected by the same bus as that used for the ISDN telephone terminal 13.

In the second embodiment, use is made of basic interfaces (2B+D). However, in a further modification of the second embodiment, the invention is applicable also to a temporary group (6B, 23B+D, 24B) interface of an extension.

Third Embodiment

A third embodiment of the invention will now be described. The first and second embodiments set forth above relate to processing when a new call originates from an extension terminal accommodated in an exchange 1. The following embodiments, however, relate to processing when a new incoming call is received from the network side.

Figure 15:
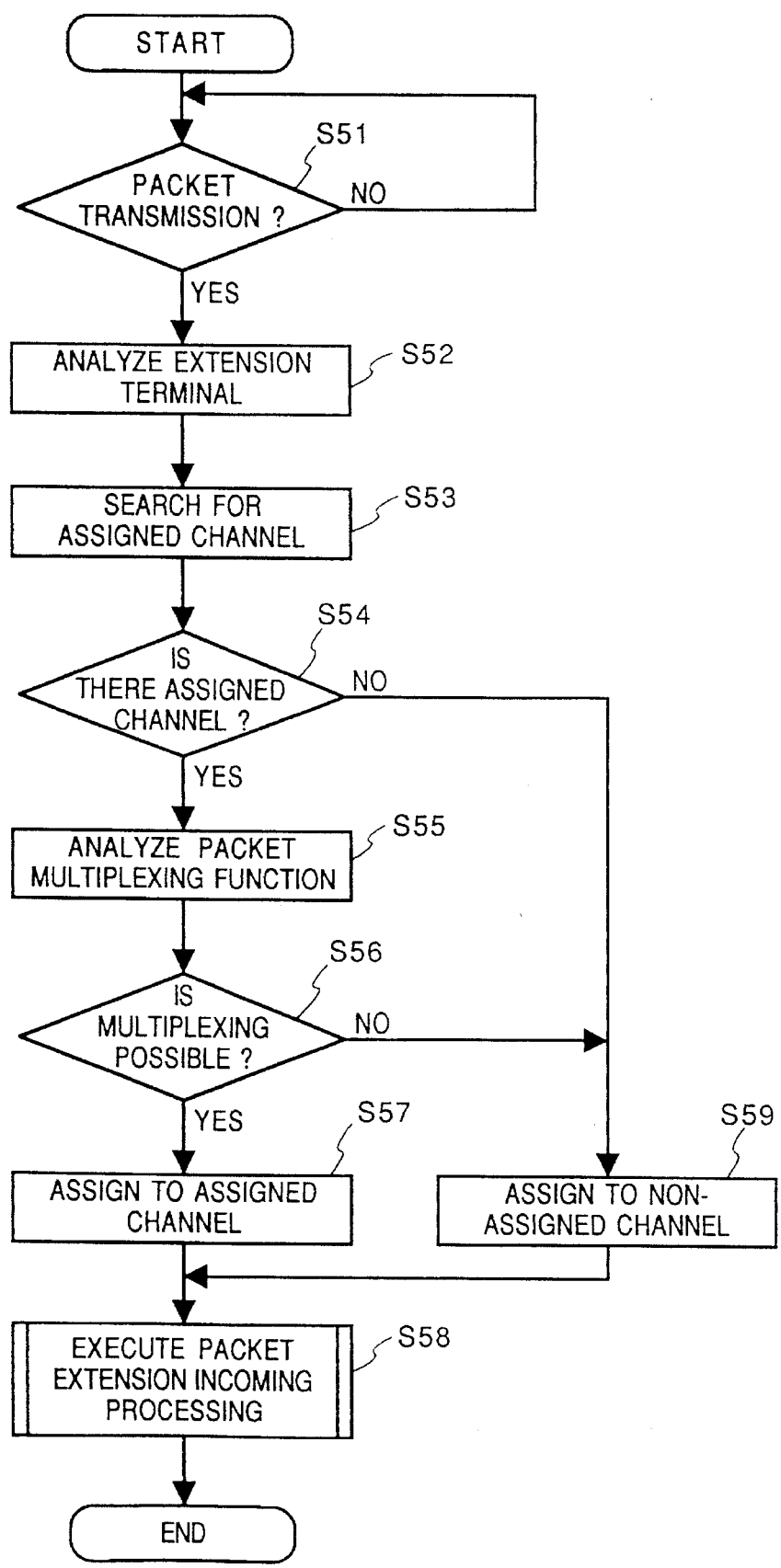
FIG. 15 is a flowchart illustrating a control operation according to the third embodiment.
Figure 16:
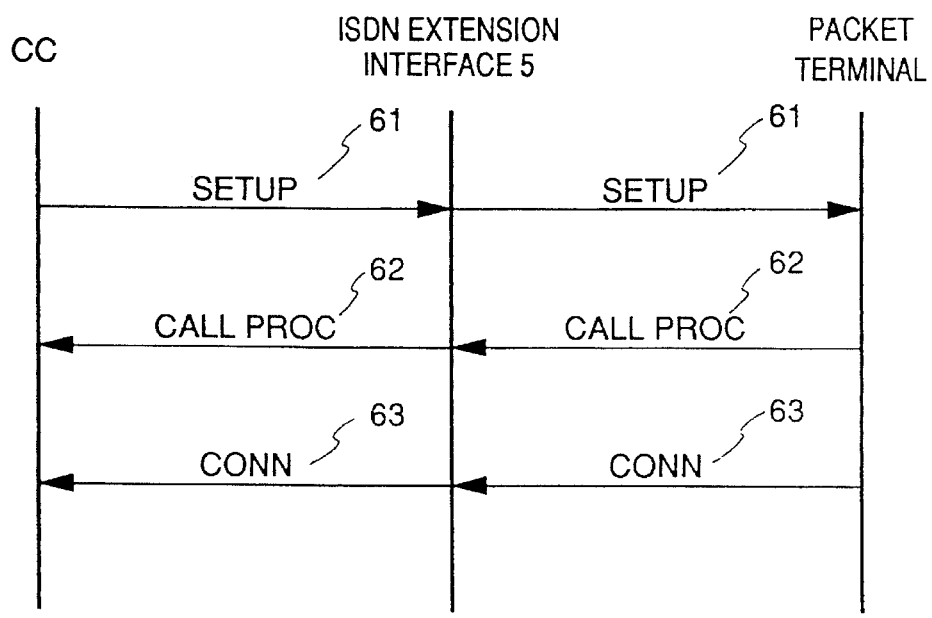
FIG. 16 is an explanatory view showing a communication sequence according to the third embodiment.
Figure 17:
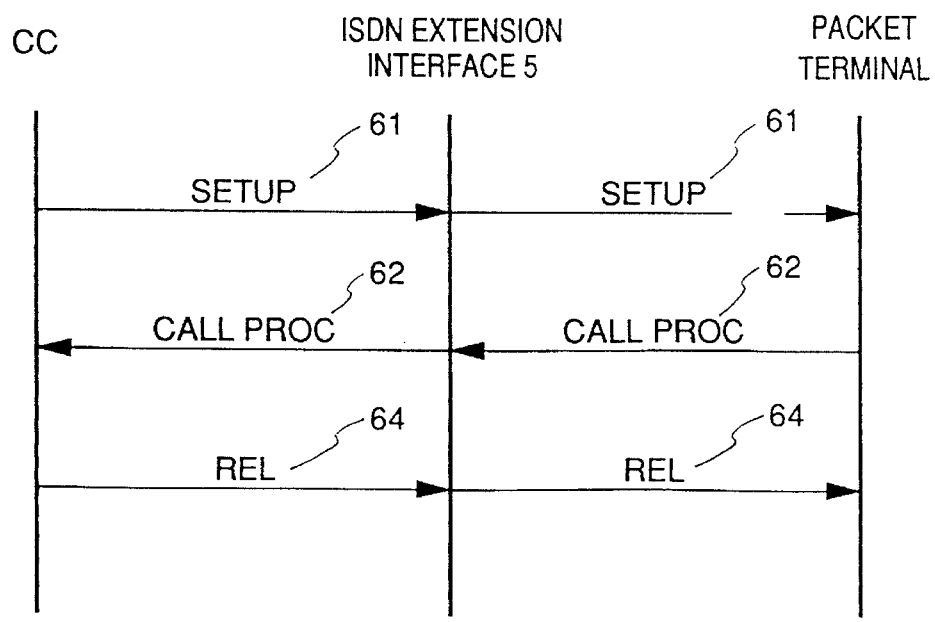
FIG. 17 is an explanatory view showing a communication sequence according to the third embodiment.

FIG. 15 is a flowchart for describing the control operation of the third embodiment. It should be noted that the system configuration of the third embodiment is similar to that of the second embodiment (FIG. 8). Further, FIGS. 16 and 17 are explanatory views showing the sequence of communication between the packet terminal 12 and the exchange 1 in the third embodiment. FIG. 16 illustrates the transmission/reception of 0 messages at the time that channel negotiation is established, and FIG. 17 illustrates the transmission/reception of messages when channel negotiation is not established. Accordingly, the characterizing features of the exchange in the third embodiment are as follows:

(1) If, in a case where a new call has been received from the network, a B channel already being used by an earlier call exists within the extension interface connected to the extension terminal designated by the call, it is attempted to use this B channel in packet switching of the call currently being received. In other words, the same B channel is used in multiplexed fashion for packet switching of two or more calls.

(2) Negotiation with regard to whether this B channel is appropriate is performed between the terminal and the exchange.

First, when an incoming packet call from the public network 15 arrives at the central-office-line interface 3 (YES at step S51), the central-office-line interface sends the incoming call to the communication controller 8. The latter analyzes the incoming call (step S52) and specifies the extension terminal to which the call is directed.

Next, at step S53, a B channel already assigned to the packet switching service is searched for in the central-office-line interface 14 to which the specified extension terminal is connected. If a B channel being used by this packet switching service is determined to exist at step S54, then analysis is performed at step S55 to determine whether this B channel is capable of packet multiplexing.

If this B channel is capable of packet multiplexing (YES at step S56), then the communication controller 8 sets the number of this B channel in the channel-in-use information within the call-setting message (message SETUP 61 in FIG. 16) and transmits this message to the ISDN extension interface 5. The ISDN extension interface 5 sends the message 61 to the packet terminal 12 via the ISDN telephone terminal 13.

On the other hand, if it is determined at step S54 that a B channel presently assigned to a packet switching service does not exist, or if it is determined (NO at step S56) that this channel exists but that it is incapable of packet multiplexing, then the communication controller 8 sets the number of the non-assigned B channel in the channel-in-use field (see FIG. 6) within the call-setting message (SETUP 61) and sends this message to the ISDN extension interface 5. The latter transmits this call-setting message 61 to the packet terminal 12 via the ISDN telephone terminal 13.

Next, upon receiving the call-setting message 61 from the ISDN extension interface 5, the packet terminal 12 analyzes the channel-in-use information within the message 61. If the channel can be utilized, the terminal 12 sets this B channel designated by the exchange 1 in the call-setting reception message (CALL PROC 62) and sends the message to the ISDN extension interface 5. Upon receiving this message, the ISDN extension interface 5 transmits the message to the communication controller 8.

On the basis of the channel-in-use information within the call-setting message (SETUP 61), the packet terminal 12 determines whether the designated channel is capable of being used on the side of the terminal 12. If the channel is incapable of being used, information to the effect that the channel designated by the exchange 1 is desired to be changed to another channel usable on the side of terminal 12 is set in the call-setting reception message (CALL PROC 62) and the terminal 12 sends this message to the ISDN extension interface 5. Upon receiving this message, the ISDN extension interface 5 sends the message to the communication controller 8. Thus, negotiation for changing the channel is started between the terminal 12 and the exchange 1 in a case where the channel designated by the exchange 1 is incapable of being used on the terminal side.

In a case where the request from the packet terminal 12 to change the B channel is acceptable, the communication controller 8 waits for reception of the answer message (CONN 63) that will be sent from the packet terminal 12. If the message of the call has been received, the packet terminal 12 transmits the answer message 63 to the ISDN extension interface 5. The latter transmits the message 63 to the communication controller 8.

This completes the extension incoming-call processing (step S58) for the packet terminal 12.

There are cases in which the communication controller 8 cannot accept the request from the packet terminal 12 to change the B channel. This is when the designated channel cannot be used in the packet switching service. In such case, information indicating the reason is set in the release message (REL) 64 and the message is sent to the ISDN extension interface 5 so that disconnection processing is executed. The ISDN extension interface 5 sends the release message 64 to the packet terminal 12.

In the third embodiment also, as shown in FIG. 14, a modification is possible in which the packet terminal 12 is connected by the same bus as that of the ISDN telephone terminal 13. The invention can be realized even if a primary group (6B, 23B+D, 24B) interface of an extension is used instead of a basic interface (2B+D).

Fourth Embodiment

Figure 18:
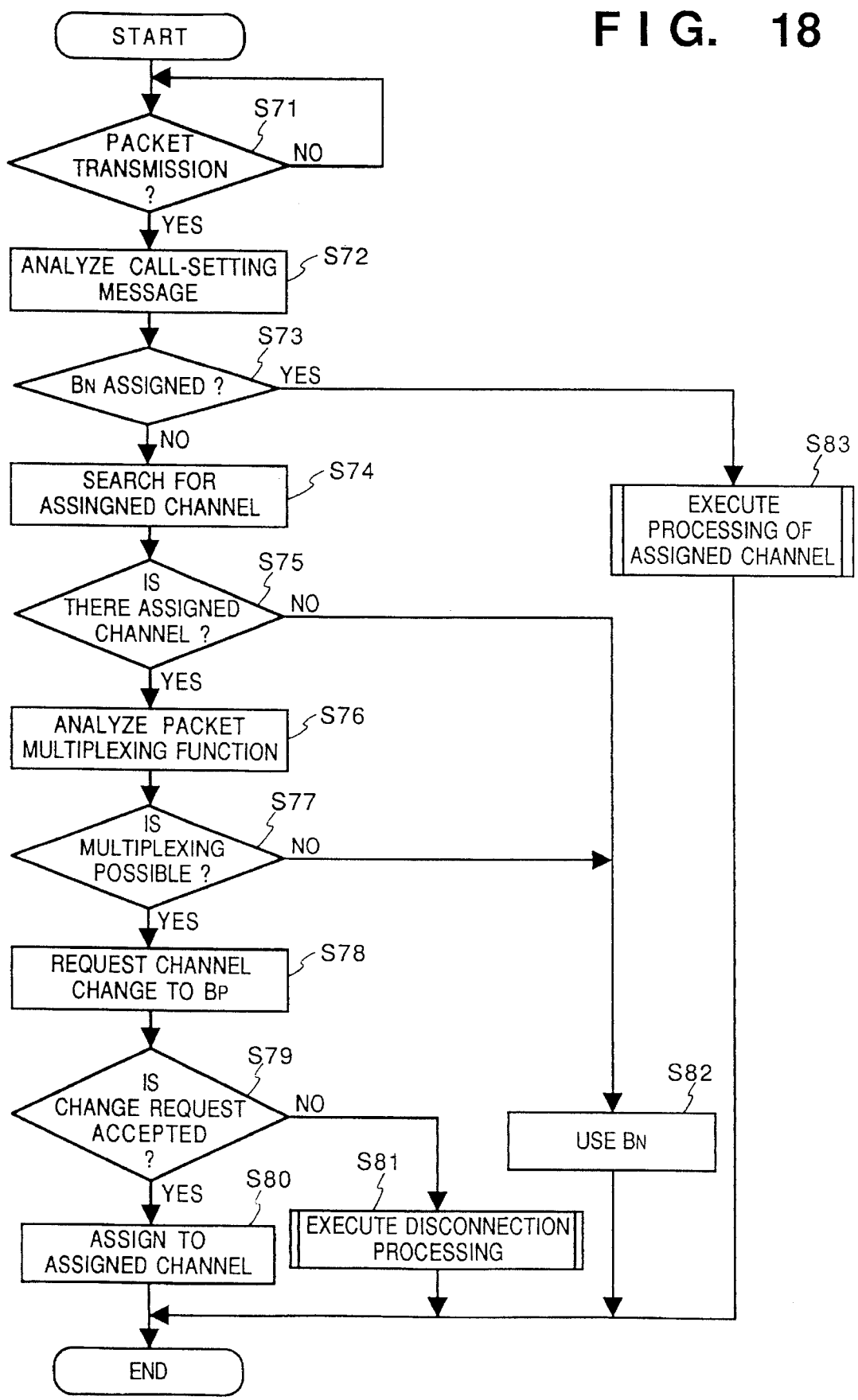
FIG. 18 is a flowchart illustrating a control operation according to a fourth embodiment.
Figure 19:
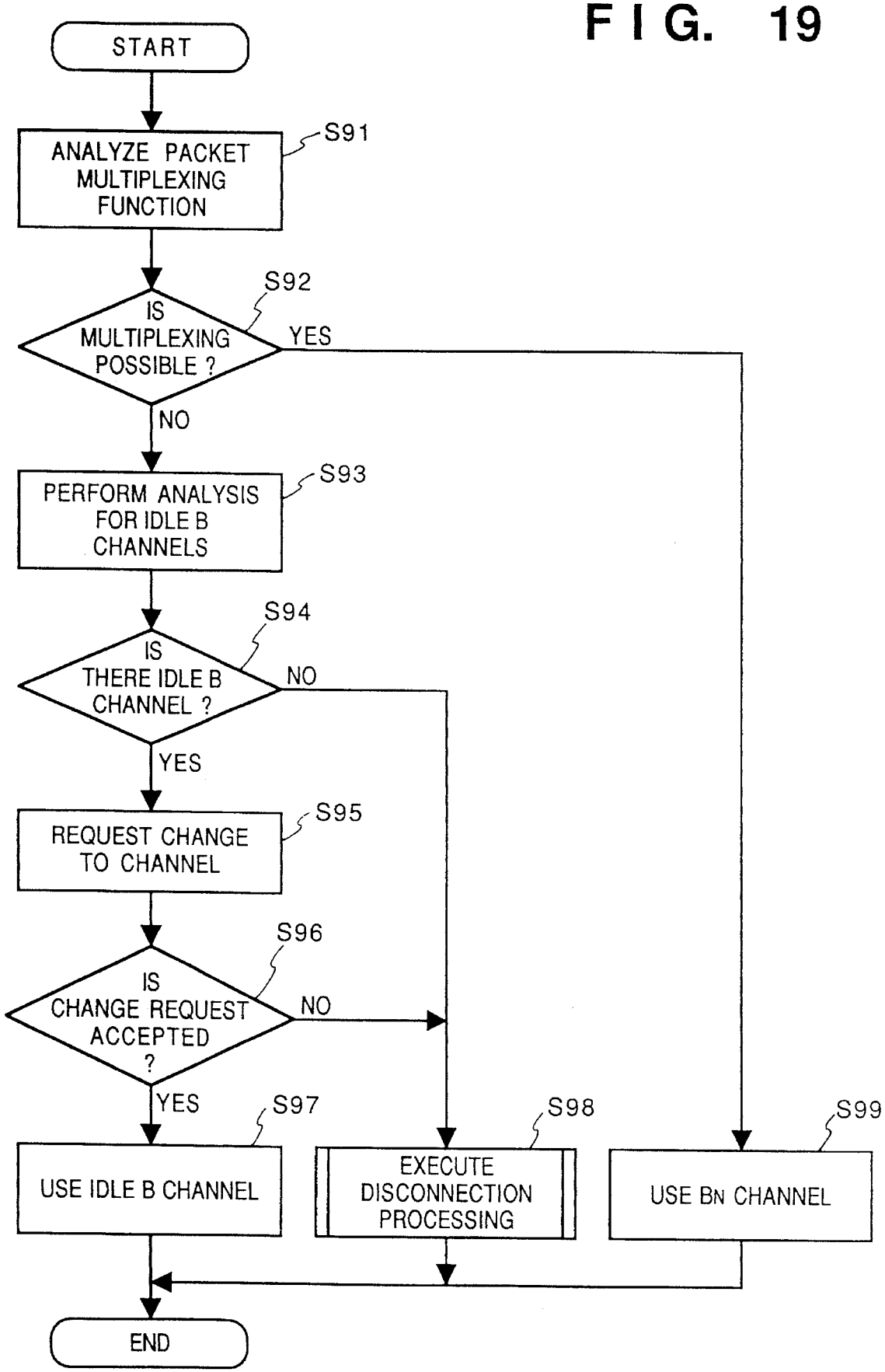
FIG. 19 is a flowchart illustrating a control operation according to a fourth embodiment.
Figure 20:
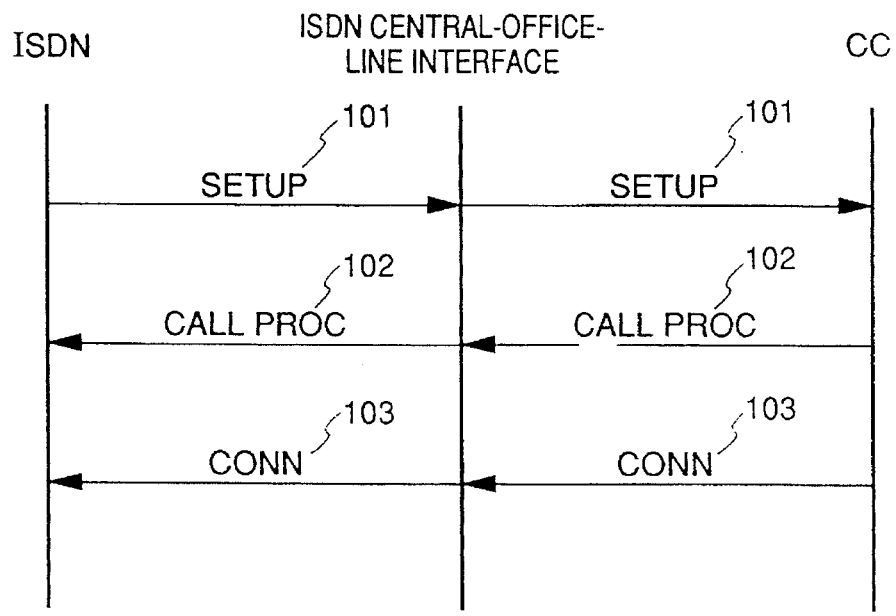
FIG. 20 is an explanatory view showing a communication sequence according to the fourth embodiment.
Figure 21:
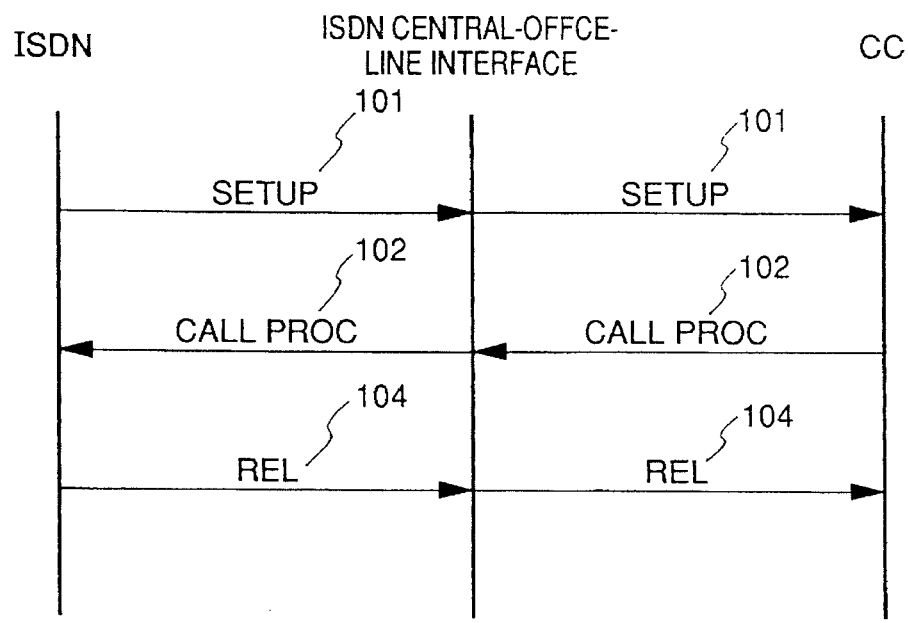
FIG. 21 is an explanatory view showing a communication sequence according to the fourth embodiment.

FIGS. 18 and 19 are flowcharts for describing the control operation of a fourth embodiment of the present invention. FIG. 18 illustrates the overall operation when an incoming packet is received, and FIG. 19 illustrates assigned B-channel processing at step S83 in FIG. 18. It should be noted that the system configuration of the fourth embodiment is similar to that of the first embodiment (FIG. 1). Further, FIGS. 20 and 21 are explanatory views showing the sequence of communication between the ISDN 2 and the exchange 1. FIG. 20 illustrates the transmission/reception of messages at the time that channel negotiation is established, and FIG. 21 illustrates the transmission/reception of messages when channel negotiation is not established.

If a new call is received from the network in the third embodiment described above, it is determined whether a B channel already being used in an earlier call exists among all of the B channels of the extension interface connected to the extension terminal designated by the call. If such as assigned B channel exists, it is attempted to use this B channel in packet switching of the call just received The characterizing features of the fourth embodiment are as follows:

(1) If a new call arrives from the network, all B channels regarding the network interface that has received this call are searched. If a B channel already assigned to packet switching of an earlier call exists, it is attempted to use this B channel in packet switching of the new call. In other words, the same B channel (provisional channel) is used in multiplexed fashion for packet switching of two or more calls in the fourth embodiment as well.

(2) In order for the aforementioned provisional channel to be decided with regard to the network interface that has received the new call, negotiation regarding whether the provision channel is suitable or not is performed between the network side and the exchange.

First, when the ISDN central-office-line interface 3 detects the call-setting message (SETUP 101) from the ISDN 2 (step S71), the ISDN central-office-line interface 3 sends this message to the communication controller 8. The latter analyzes the B-channel-in-use information (see FIG. 6) contained in the call-setting message and then determines whether the B channel obtained by this analysis has already been assigned to a packet switching service (step S73).

In a case where the B channel (the channel number of which is represented by $B_N$) designated by the network 2 has not yet been used in a packet switching service, a B channel (the channel number of which is represented by $B_P$) already assigned to the packet switching service is searched for within the interface 3 (step S74). If existence of the B channel $B_P$ already assigned to the packet switching service is ascertained by the search (YES at step S75), an analysis is performed at step S76 to determine whether this B channel is capable of packet multiplexing.

If the assigned B channel is capable of packet multiplexing (YES at step S77), the communication controller 8 attempts to use the assigned channel $B_P$ found at step S75 in packet switching rather than the channel $B_N$ designated by the ISDN 2. To this end, information requesting the change to the assigned B channel $B_P$ is set in the call-setting reception message (CALL PROC 102) and this message is then sent to the ISDN central-office-line interface 3 (step 78). Upon receiving the message 102, the ISDN central-office-line interface 3 transmits the message 102 to the ISDN 2.

Upon receiving this call-setting reception message, the ISDN 2 determines at step S79 whether the request from the exchange 1 to change the B channel is acceptable or not. If it is acceptable, the ISDN 2 waits for reception of the answer message (CONN 103) that will be sent from the communication controller 8. The communication controller 8 sends the answer message 103 to the ISDN central-office-line interface 3, and the latter transmits the answer message 103 to the ISDN 2. As a result, the ISDN 2 performs communication (step S80) using the B channel $B_P$, which is already being used in the exchange, instead of the B channel $B_N$ designated by the network 2.

If it is determined at step S79 that the ISDN 2 is incapable of accepting the request from the communication controller 8 to change the B channel, the network 2 transmits the release message (REL) 104 to the ISDN central-office-line interface 3, which proceeds to send the release message 104 to the communication controller 8 (step S81).

If it is determined at step S75 that a B channel being used in the packet switching service does not exist within the interface 3, or if it is determined at step S77 that packet multiplexing is not possible, then the communication controller 8 sets the B channel $B_N$ designated by the ISDN 2 in the call-setting acceptance message (CALL PROC 102) and transmits this message to the ISDN central-office-line interface 3. Upon receiving the message 102, the ISDN central-office-line interface 3 sends the message 102 to the ISDN 2. Further, the communication controller 8 transmits the answer message (CONN 103) to the ISDN central-office-line interface 3, which proceeds to send the answer message 103 to the ISDN 2. As a result, the ISDN 2 performs communication (step S82) using the designated B channel $B_N$.

In a case where the B channel analyzed at step S72 is already being used in the packet switching service (YES at step S73), then step S83 is executed (FIG. 19).

In FIG. 19, the communication controller 8 performs an analysis at step S91 to determine whether the B channel already used in the packet switching service is capable of packet multiplexing. If packet multiplexing is possible (YES at step S92), the communication controller 8 sets the B channel designated by the ISDN 2 in the call-setting reception message (CALL PROC 102) and transmits this message to the ISDN central-office-line interface 3 (step S99). Upon receiving this message, the ISDN central-office-line interface 3 transmits the message 102 to the ISDN 2.

In a case where packet multiplexing is found to be impossible at step S92, the communication controller 8 searches for an idle channel within the same interface (step S93). If an idle channel exists (YES at step S94), then the communication controller 8 sets request information, which requests that the B channel designated by the ISDN 2 be changed to an idle channel, in the call-setting reception message (CALL PROC 102) and transmits this message to the ISDN central-office-line interface 3 (step S95). Upon receiving the message 102, the ISDN central-office-line interface 3 transmits the message 102 to the ISDN 2.

In a case where the request to change the B channel is acceptable (YES at step S96), the ISDN 2, which has received the call-setting reception message 102, waits for reception of the answer message (CONN 103) that will be sent from the communication controller 3. The communication controller 8 transmits the answer message 103 to the ISDN central-office-line interface 3, which proceeds to send the answer message 103 to the ISDN 2. As a result, the ISDN 2 performs communication using an idle B channel (step S97).

In a case where it is determined at step S96 that the ISDN 2 cannot accept the request from the communication controller 8 to change the B channel, information indicating the reason is set in the release message (REL 104) and the message is transmitted to the ISDN central-office-line interface 3, which then proceeds to send the answer message 104 to the communication controller 8 (step S98). Similarly, if an idle B channel is found not to exist at step S94, the program proceeds to disconnection processing (step S98).

As many apparently widely different embodiments of the present invention can be made without departing from the spirit and scope thereof, it is to be understood that the invention is not limited to the specific embodiments thereof except as defined in the appended claims.

What is claimed is:

1. A private branch exchange for supporting a packet switching service, which accommodates a main wire between a network and a packet terminal, the main wire accommodating a plurality of channels, the private branch exchange comprising:

detecting means for detecting a channel of the plurality of channels designated by the network or the terminal performing packet switching for a first call, when the first call is originated from the network or the terminal;

means for searching a channel among the plurality of channels to be assigned for a packet switching for a second call;

determining means for determining whether the channel used in packet switching for first call is available for multiplexing the second call; and negotiating means for negotiating with the network or the terminal in such a manner that in a case where the determining means determines that the channel used in packet switching for first call is available for multiplexing the second call, the second call will be assigned to the channel used in the packet switching for the first call to leave another channel unused, while in a case where the determining means determines that the channel used in the packet switching for first call is not available for multiplexing the second call, the second call will be assigned to a channel unused.

2. A private branch exchange for supporting a packet switching service according to claim 1, further comprising;

informing means for informing the network or the terminal of the channel assigned by said negotiating means, so that a multiplexed packet communication is performed through the assigned channel.

3. The exchange according to claim 2, wherein the network is an ISDN.

4. The exchange according to claim 1, wherein the network is an ISDN.

5. A private branch exchange, which has a main wire interface for performing originating call control with respect to a main wire which includes a plurality of channels from a network to a terminal, for supporting a packet switching service, comprising:

originating means for originating a packet call to the network via said main wire;

searching means for searching a channel which has been assigned for a packet switching among the plurality of channels for the originated packet call;

determining means for determining whether the searched channel can be multiplexed for another call; and negotiating means for negotiating with the network in such a manner that in a case where the determining means determines that the searched channel can be multiplexed for another call, the originated packet call will be assigned to the searched channel to leave another channel unused, while in a case where the determining means determines that the searched channel cannot be multiplexed for another call the originated packet call will be assigned to another channel which is not used for the packet switching.

6. The exchange according to claim 5, wherein when no channel has been assigned for a packet call, said searching means specifies one among any usable channel of the main wire for the originated packet call.

7. The exchange according to claim 5, wherein when no channel capable of performing communication by multiplexing packets has been assigned, said negotiating means assigns one among any usable idle channel of the main wire for the originated packet call.

8. The exchange according to claim 5, wherein said exchange accommodates an ISDN extension interface, and said extension terminal is an ISDN packet terminal accommodated by the ISDN extension interface.

9. The exchange according to claim 5, wherein said exchange accommodates a non-ISDN extension interface and said extension terminal is a non-ISDN packet terminal accommodated by the non-ISDN extension interface.

10. The exchange according to claim 5, wherein the main wire is connected to an ISDN.

11. A private branch exchange for supporting a packet switching service, which has a main wire interface for accommodating a main wire having a plurality of channels from a network, and an extension interface for accommodating a terminal, comprising:

first specifying means for tentatively specifying a channel among the plurality of channels, which is to be used in a packet switching service designated by the network or the terminal;

detecting means for detecting any channel of the plurality of channels which has been assigned for a packet switching; and negotiating means, in a case where the channel specified by said first specifying means is different from the channel detected by said detecting means for performing negotiation with the network or the terminal in such a manner that the channel detected by said detecting means will be used for multiplexed packet switching to leave a channel unused.

12. The exchange according to claim 11, wherein said negotiating means includes determining means for determining whether the channel detected by said detecting means has been used for a packet switching; and said negotiating means assigns a call to the channel detected by said detecting means when said determining means determines the detected channel has been used for the packet switching.

13. The exchange according to claim 11, wherein said terminal is an ISDN packet terminal.

14. The exchange according to claim 11, wherein the network is an ISDN.

15. Channel determining method for packet switching, comprising the steps of:

detecting an incoming packet call from a line consisting of a plurality of channels;

searching a channel among the plurality of channels which has been assigned for a packet switching;

determining whether the searched channel in said searching step can be multiplexed for another call; and assigning the incoming packet call, in a case where the searched channel is determined as available for multiplex, to the searched channel so that the assigned channel is to be multiplexed with another call, while assigning the incoming packet call, in a case where the searched channel is determined as not available for multiplex, to an unassigned channel.

16. The method according to claim 15, wherein the incoming packet call is detected from an ISDN in said detecting step.

17. The method according to claim 15, wherein the channel which is already being used and capable of performing communication by multiplexing packets is searched in said searching step.

18. A channel determining method for packet switching, comprising the steps of:

tentatively specifying a channel among the plurality of channels carried on a line, which is to be used in a packet switching service designated by the network or the terminal;

detecting any channel of the plurality of channels which has been assigned for another packet switching; and in a case where the channel specified in said specifying step is different from the channel detected in said detecting step, performing negotiation with the network or the terminal in such a manner that the channel detected in said detecting step will be used for multiplexed packet switching to leave said channel specified in said specifying step unused so as to be available for further calls.

19. The method according to claim 18, wherein said negotiating step includes a step for determining whether the channel detected in said detecting step has been used for a packet switching; and wherein in said negotiating step, a call is assigned to the channel detected in said detecting step when said determining step determines that the detected channel has been used for the packet switching.

* * * * *